UNITED STATES PATENT OFFICE.

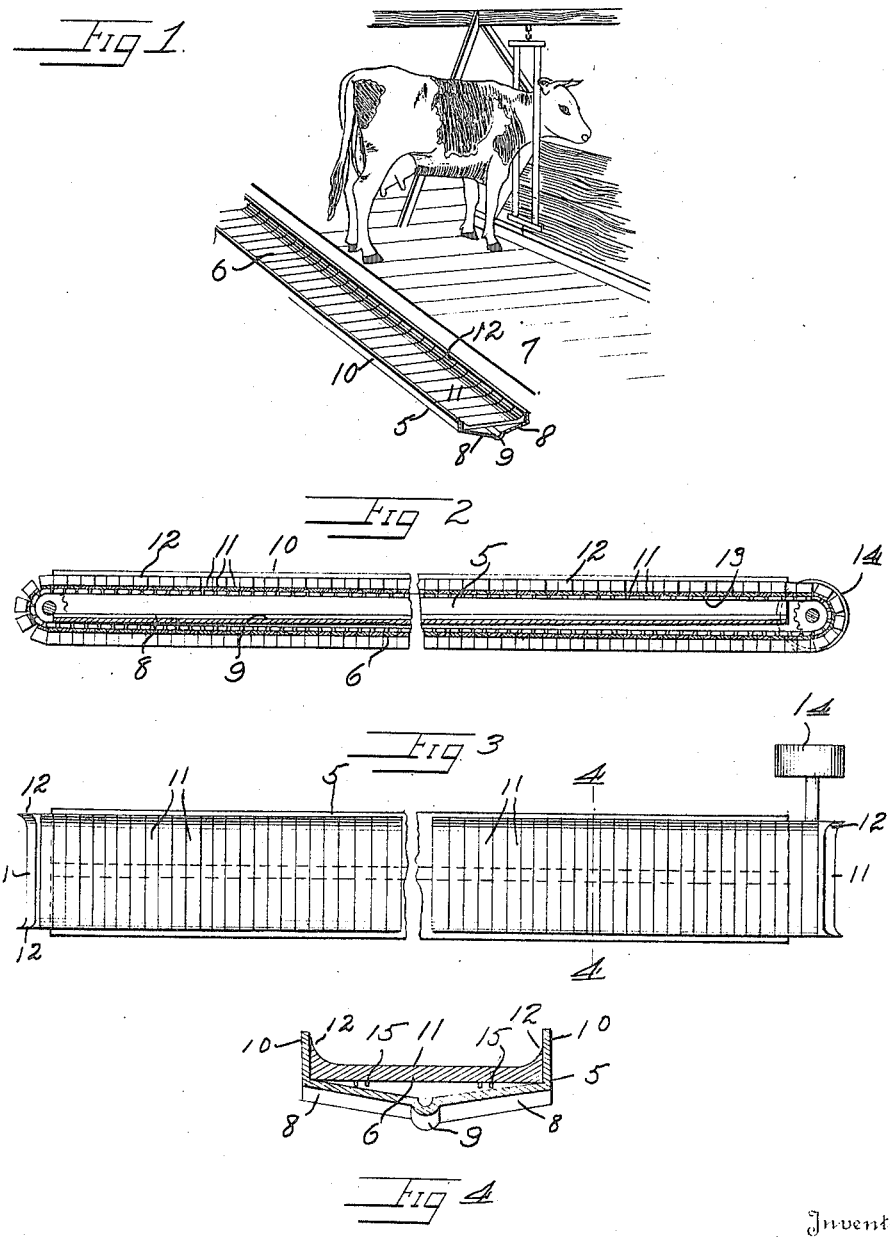

CLIFTON J. CARTER, OF QUAKER CITY, OHIO.

MANURE-CONVEYER.

1,187,814.     Specification of Letters Patent.     Patented June 20, 1916.

Application filed August 9, 1915. Serial No. 44,469.

*To all whom it may concern:*

Be it known that I, CLIFTON J. CARTER, a citizen of the United States, residing at Quaker City, in the county of Guernsey and State of Ohio, have invented certain new and useful Improvements in Manure-Conveyers, of which the following is a specification.

This invention relates to conveying or transferring devices, and more particularly relates to means for removing manure from the stalls of animals.

As a principal object, it is contemplated by this invention to provide a runway, channeled for the passage of liquid manure, and having movable therethrough a conveyer fitted for the transportation of solid or lump manure, the runway with its associated conveyer intersecting the stalls of the animals to be served thereby and on the flooring level.

Sanitary conditions in cow-stables and dairies, particularly, have been undergoing steady improvement in recent years, but are still subject to betterment in the manner of manure removal, especially. Clean milk is an impossibility where this subject is neglected, but the existent means, which contemplate manual handling of the manure, are all open to objection on the obvious grounds of the human equation. Manure handling is at its best only when automatic. The means comprehended by the present invention, accordingly, are well adapted to the work in hand. The runway containing the manure conveyer is so arranged with respect to the stalls that the excreta of the animals will readily fall thereinto, and both runway and conveyer, carrying the liquid and lump manure, are led to the exterior of the building, where their contents may be emptied, the entire operation being automatic and necessitating no manual interference.

The above and additional objects, which will be hereinafter more specifically treated, are accomplished by such means as are illustrated in the accompanying drawings, described in the following specification and then particularly pointed out in the appended claims to this application.

With reference to the drawings, wherein there is illustrated the preferred embodiment of this invention as it is reduced to practice, and throughout which like characters of reference designate similar parts:

Figure 1 is a perspective view showing the arrangement of the manure conveyer provided by this invention with respect to the stall of an animal; Fig. 2 is a fragmentary longitudinal sectional view through the conveyer; Fig. 3 shows the invention in plan, and Fig. 4 is a transverse section taken on the line 4—4 of Fig. 3.

The manure conveyer of this invention includes the runway 5 and conveyer proper 6, the latter being arranged to move longitudinally of the runway. The runway is trough-shaped and extends transversely of the stalls served thereby, intersecting each stall at the flooring level 7. Any desired material may be employed in the construction of this runway, the bottom of which is formed of portions 8 sloping toward the center and integrally connected by the trough 9. Side walls 10 are formed upon the bottom portions 8 for the accommodation therebetween of the conveyer 6, and the runway as a whole is arranged on a slight incline, to permit the trough 9 to carry off the liquid manure.

The more solid portions of the manure masses are taken care of by the conveyer 6. This latter comprises the strips 11, the extremities of each of which are arcuately upturned in the manner denoted by the numeral 12, and the customary sprocket chains 13 which are trained in quite the usual manner over sprockets 14 and which may be connected to the conveyer strips 11 through the medium of ears 15 dependent in pairs from the latter.

It will be noted that the runway 5 is adapted to support the upper half of the conveyer 6, the lower half of the latter traveling below the runway trough 9. By means of this arrangement, the conveyer passing through the rear of the stalls will receive lump excreta from the animals, while all liquid manure passing through the interstices between the conveyer strips will be received in the trough 9 and carried to the exterior of the building at the dumping point of the conveyer, where any desired provision for the reception and utilization of the manure removed from the stalls may be made.

While in the foregoing, however, there has thus been illustrated in the drawings and described in the specification, such combination and arrangement of elements as constitute the preferred embodiment of the present invention, it is desired to emphasize the fact that such minor changes in the matters of proportion and degree may be made in later adaptations of the device as shall not alter the spirit of the invention, as defined in the appended claims.

What is claimed is:

1. The combination with a lump conveyer comprising upper and lower spaced flights, of a liquid trough arranged at an inclination between said flights, the margins of said trough being upwardly bent to embrace the upper flight of the conveyer to guide the same.

2. In a conveyer, a lump conveyer comprising a conveying body having a plurality of sections forming an endless conveyer having upper and lower spaced flights, a liquid conveyer associated therewith comprising, a trough having inclined walls and a channel arranged axially thereof, said trough being inclined throughout its length in the direction of operation of the first mentioned conveyer, the longitudinal marginal edges of said liquid conveyer being bent upwardly to form flanges embracing the upper flight of said first conveyer to guide the latter.

In testimony whereof I affix my signature hereto.

CLIFTON J. CARTER.